United States Patent
Shen et al.

(10) Patent No.: US 9,398,217 B2
(45) Date of Patent: Jul. 19, 2016

(54) VIDEO STABILIZATION USING PADDED MARGIN PIXELS

(71) Applicant: Microsoft Corporation, Redmond, WA (US)

(72) Inventors: Jinglin Shen, Redmond, WA (US); Naveen Thumpudi, Redmond, WA (US); Jeffrey D. Day, Kirkland, WA (US); Yongjun Wu, Bellevue, WA (US); Sandeep Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/515,463

(22) Filed: Oct. 15, 2014

(65) Prior Publication Data

US 2016/0112638 A1  Apr. 21, 2016

(51) Int. Cl.
*H04N 5/232* (2006.01)
*H04N 5/265* (2006.01)

(52) U.S. Cl.
CPC ........... *H04N 5/23248* (2013.01); *H04N 5/265* (2013.01)

(58) Field of Classification Search
CPC ............................ H04N 5/23248; H04N 5/265
USPC ........................................................ 348/208.6
See application file for complete search history.

(56) References Cited

U.S. PATENT DOCUMENTS

| | | | |
|---|---|---|---|
| 7,408,986 B2 | 8/2008 | Winder | |
| 7,680,353 B2 | 3/2010 | Jojic et al. | |
| 7,880,769 B2 | 2/2011 | Qi | |
| 8,130,277 B2 | 3/2012 | Jayachandra et al. | |
| 2005/0179784 A1* | 8/2005 | Qi | H04N 5/145 348/208.1 |
| 2006/0034530 A1 | 2/2006 | Park | |
| 2009/0010338 A1 | 1/2009 | Wang | |

(Continued)

FOREIGN PATENT DOCUMENTS

| | | |
|---|---|---|
| EP | 1465414 A2 | 10/2004 |
| EP | 2605510 A1 | 6/2013 |

OTHER PUBLICATIONS

"Video Stabilization MFT (Windows)", Published on: Nov. 17, 2011, pp. 2 Available at: http://msdn.microsoft.com/en-us/library/windows/desktop/hh162914(v=vs.85).aspx.

Mangiat, et al., "Block Based Completion for Video Stabilization", In Conference Record of the Forty Fourth Asilomar Conference on Signals, Systems and Computers, Nov. 7, 2010, 4 pages. http://ieeexplore.ieee.org/stamp/stamp.jsp?tp=&arnumber=5757503.

(Continued)

*Primary Examiner* — Gevell Selby
(74) *Attorney, Agent, or Firm* — Sunah Lee; Judy Yee; Micky Minhas

(57) ABSTRACT

One or more techniques and/or systems are provided for video stabilization and/or for image frame generation. For example, a user may instruct a video application hosted on a smart phone to capture a video at a target resolution of 1080 pixels. A padded input having a padded resolution that is larger than the target resolution may be obtained from a capture device, such as a camera of the smart phone. The padded input may be provided to a video stabilization component to obtain a target image frame having the target resolution. In this way, the video stabilization component may perform cropping using padded margin pixels (e.g., additional pixels of the padded input beyond the 1080 pixels of the target resolution) so that image upscaling after cropping (e.g., to account for global warping, etc.) may be mitigated to reduce blur that may otherwise result from image upscaling.

20 Claims, 11 Drawing Sheets

(56) References Cited

U.S. PATENT DOCUMENTS

| | | | |
|---|---|---|---|
| 2009/0237516 A1* | 9/2009 | Jayachandra | H04N 5/144 348/208.4 |
| 2009/0316010 A1 | 12/2009 | Nomura | |
| 2011/0085049 A1* | 4/2011 | Dolgin | H04N 5/23248 348/208.4 |
| 2011/0141225 A1 | 6/2011 | Stec et al. | |
| 2011/0193978 A1 | 8/2011 | Wu et al. | |
| 2012/0207211 A1* | 8/2012 | Song | H04N 19/176 375/240.03 |
| 2013/0165753 A1 | 6/2013 | Takahashi | |
| 2014/0160309 A1 | 6/2014 | Karpenko | |
| 2014/0192207 A1 | 7/2014 | Ji et al. | |

OTHER PUBLICATIONS

"Picture Aspect Ratio (Windows)", Published on: Oct. 15, 2011, pp. 6 Available at: http://msdn.microsoft.com/en-us/library/windows/desktop/bb530115(v=vs.85).aspx.

International Search Report and Written Opinion Issued in PCT Application No. PCT/US2015/055189 (foreign counterpart application to U.S. Appl. No. 14/515,463), Mailed Date: Jan. 28, 2016, 16 Pages.

Lu, et al., "Resource-driven content adaptation", In Proceedings of SPIE, vol. 6065, Feb. 2, 2006, 11 Pages.

PCT Application No. PCT/US2015/055189, (foreign counterpart application to U.S. Appl. No. 14/515,463), Article 34 Demand, letter and amended claims, dated Jun. 14, 2016, 18 Pages.

\* cited by examiner

VIDEO STABILIZATION USING PADDED MARGIN PIXELS

BACKGROUND

Many computing devices may have image capture capabilities. In an example, a user may capture vacation photos using a digital camera, and the user may transfer the vacation photos to a laptop for sharing with other users through a social network. In another example, the user may capture a video of a daughter's soccer game using a mobile device such as a smart phone.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for video stabilization and/or for image frame generation are provided herein. In an example of video stabilization, a capture device is negotiated with to obtain a padded input. The padded input comprises padded margin pixels. The padded input has a padded resolution that is larger than a target resolution. The padded input is provided to a video stabilization component to obtain a target image frame having the target resolution.

In an example of image frame generation, a capture device is negotiated with to obtain a padded input. The padded input comprises padded margin pixels. An image frame is obtained for combination with the padded input. The padded margin pixels are utilized to compensate for one or more missing pixels between the image frame and the padded input to create a combined image frame.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
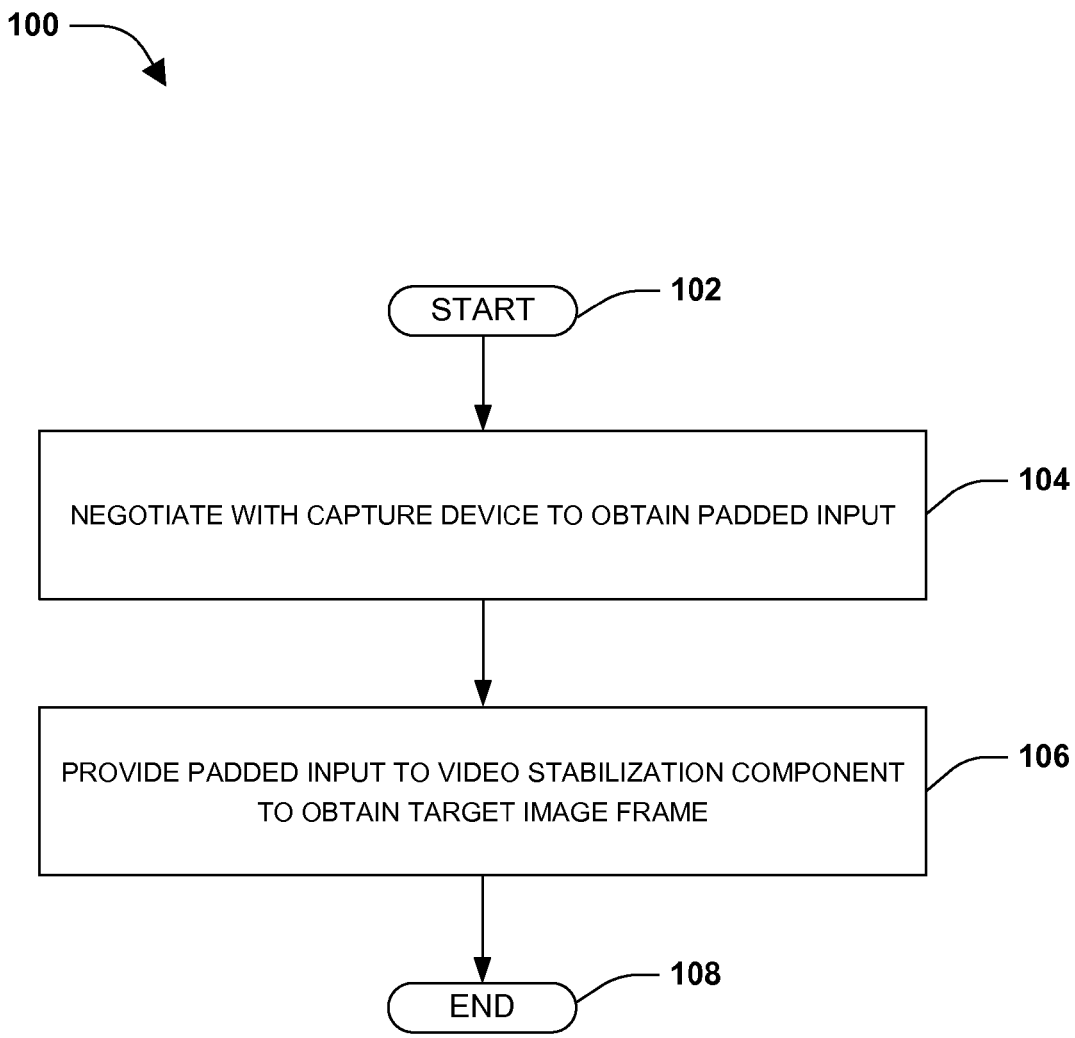
FIG. 1 is a flow diagram illustrating an exemplary method of video stabilization.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for video stabilization and/or image frame generation are provided herein. While capturing video using a capture device, hand jitter of the user and/or other factors such as user motion may result in undesirable video quality. Thus, a video stabilization component may crop an image frame into a smaller cropped frame that is warped in a manner that improves video stabilization (e.g., warped according to a forward facing view of a scene as opposed to a tilted view of the scene resulting from hand jitter), and then may expand the smaller cropped frame into an upscaled full size frame that may suffer from blur or other visual issues due to the upscaling. Accordingly, as provided herein, a capture device may be negotiated with to obtain a padded input having a padded resolution that is larger than a target resolution (e.g., the user may request a target video resolution of 1920×1080, and thus the capture device may be invoked to capture padded input frames at a padded resolution of 2112×1188 in order to obtain a 10% padding of padded margin pixels (e.g., 10% more pixels than the 1920×1080 resolution)). The padded input may be provided to a video stabilization component so that the video stabilization component may create a target image frame having the target resolution (e.g., the video stabilization component may crop 10% of the pixels of the padded input to create a target image frame having the 1920×1080 target resolution without performing upscaling). Because the video stabilization component may utilize the padded margin pixels during processing, minimal to no upscaling may be performed in order to reduce blur. In this way, video capture functionality of the capture device, such as a smart phone camera, may be improved so that the user may create stabilized videos that are less blurry. The amount of padded input may be determined based upon available resources of a device, such as the smart phone, associated with the capture device, which may improve processing efficiency (e.g., 10% padded margin pixels, as opposed to 30% padded margin pixels, may be obtained so that the smart phone is not computationally overburdened during image stabilization that may otherwise occur when trying to process 30% more pixels).

An embodiment of video stabilization is illustrated by an exemplary method 100 of FIG. 1. At 102, the method starts. In an example, a computing device may be associated with a capture device (e.g., image processing circuitry of a digital camera; a smart phone comprising a camera, a wearable device such as glasses or a watch comprising a camera, etc.). The capture device may be capable of capturing video, such as image frames of a video. The capture device may be associated with a video stabilization component that may be configured to stabilize videos in order to compensate for hand jitter or other motion by the user while capturing video. The user may set a target resolution at which the video is to be captured, such as a 1080p resolution. However, the capture device may be capable of capturing video, such as image frames, that have a larger resolution than the target resolution. As provided herein, the capture device may be instructed to capture padded input having a padded resolution larger than the target resolution. The padded input comprises padded margin pixels. The padded input may be provided to the video stabilization component for image stabilization to create a target image having the target resolution. Because the padded input has more pixels than the target resolution, the video stabilization component may reduce or eliminate the amount of image upscaling performed after cropping because the padded input has extra pixels, such as the padded margin pixels, that can be cropped without reducing the padded input below the target resolution.

At 104, the capture device may be negotiated with to obtain a padded input. For example, a user or application may set a video capture resolution parameter to a target resolution of 1920×1080. A padded pixel percentage parameter (e.g., a padding value of about 15%, a padding value less than or equal to about 20%, etc.) may be selected so that the capture device may obtain the padded input according to the padded pixel percentage parameter (e.g., a 2112×1188 padded input corresponding to a 10% padded pixel percentage parameter). In an example, the padded pixel percentage parameter may be selected and/or generated based upon at least one of a cropping metric used by the video stabilization component, a field of view (FOV) of a sensor of the capture device, an amount of padding to be used by the video stabilization component, a set of available resolutions for the capture device, the target resolution, or an analysis of available computer resources of the computing device (e.g., processor load and bandwidth, memory, etc.) so that the padded pixel percentage parameter corresponds to an amount of image frame data that is reasonable for the computing device to process. In an example, where the padded pixel percentage parameter is selected based upon the cropping metric, the video stabilization component may crop 15%, for example, of an image during stabilization, where obtaining 15% more pixel data may allow the video stabilization component to crop the padded input with reduced image upscaling otherwise used to compensate for cropped pixels.

In an example, negotiation to obtain the padded input may be based upon whether the padded input will cover a larger field of view (FOV) than non-padded input, which may be based upon capabilities of one or more sensors of the capture device. For example, a first set of sensors may have an increased resolution as compared to a second set of sensors but may correspond to the same FOV. The first set of sensors may, for example, correspond to 2112×1188 input for a particular region or FOV whereas the second set of sensors may correspond to 1920×1080 input for the same region. The 2112×1188 input is thus a more dense sampling for the same FOV. Alternatively, the first set of sensors may have the same or different sampling density as compared to the second set of sensors but may nevertheless yield a padded input that has a larger FOV as compared to the first set of sensors. Padded input may also be a function of capture capability of one or more sensors. For example, where a set of sensors can accommodate or support a 10% larger FOV at a target or desired resolution, then cropping scenarios up to 10% may be covered, whereas a 15% cropping scenario, for example, would not be available for video stabilization.

The padded input may comprise padded margin pixels. The padded input may have a padded resolution that is larger than the target resolution at which the target image frame is to be generated by the video stabilization component. For example, the user may attempt to capture a video comprising target image frames at a target resolution of 1920×1080. The capture device may be instructed to capture the padded input at a padded resolution of 2112×1188 based upon the 10% padded pixel percentage parameter. In this way, the padded input has the padded resolution of 2112×1188 with 10% padded margin pixels as compared to the target resolution 1920×1080 pixels (e.g., the capture device is capturing image frames that are larger than what will be provided to the user so that the video stabilization component has more pixels to use during cropping, which may result in less upscaling and blur during image stabilization).

At 106, the padded input may be provided to the video stabilization component to obtain the target image frame having the target resolution. For example, the video stabilization component may be instructed to utilize one or more padded margin pixels during image stabilization to generate the target image frame (e.g., the video stabilization component may take the padded margin pixels into consideration when performing cropping or other functionality during image stabilization). The video stabilization component may utilize the one or more padded margin pixels in place of image upscaling functionality (e.g., instead of upscaling non-padded images to achieve the target resolution after cropping, the video stabilization component may use padded margin pixels to fill cropped regions) to generate the target image frame. Mitigating image upscaling after cropping may reduce image blur, softness, or other visual issues that may have resulted from image upscaling by the video stabilization component.

In an example where the padded pixel percentage parameter was derived from the cropping metric, an instruction may be provided to the video stabilization component regarding how to crop the padded input. In an example, responsive to the padded pixel percentage parameter (e.g., 15%) matching the cropping metric (e.g., 15%), the video stabilization component may be instructed to crop a portion of the padded input that corresponds to the padded pixel percentage parameter to create the target image frame (e.g., the video stabilization component may crop 15% of the padded input to create the target image frame at the target resolution). Responsive to the padded pixel percentage parameter (e.g., 20%) being larger than the cropping metric (e.g., 15%), the video stabilization component may be instructed to crop a portion of the padded input corresponding to the cropping metric to create an intermediary image frame. The video stabilization component may be instructed to downsize the intermediary image frame to create the target image frame at the target resolution. Responsive to the padded pixel percentage (e.g., 10%) being smaller than the cropping metric (e.g., 15%), the video stabilization component may be instructed to crop a portion of the padded input corresponding to the cropping metric. An aperture setting may be set to indicate that a region of the target image frame (e.g., 5%) is invalid.

The padded input may be used for various other implementations, such as for creating a panorama, for creating a globally aligned image frame, and/or for creating a naturally padded input for use by video encoding functionality. In an example of creating a globally aligned image frame, an image frame, which is to be globally aligned with the padded input, may be obtained. The padded margin pixels may be used to compensate for one or more missing pixels between the image frame and the padded input to create the globally aligned image frame. In an example of creating a panorama, an image frame, which is to be used with the padded input for generating the panorama, may be obtained. The padded margin pixels may be used to compensate for one or more missing pixels between the image frame and the padded input to create the panorama. In an example of creating a naturally padded input, a natural padding parameter, used by video encoding functionality, may be identified. The padded margin pixels may be utilized to create a naturally padded input for use by the video encoding functionality based upon the natural padding parameter (e.g., as opposed to using padding comprised of black, green, or other stock colored pixels). At 110, the method ends.

Figure 2:
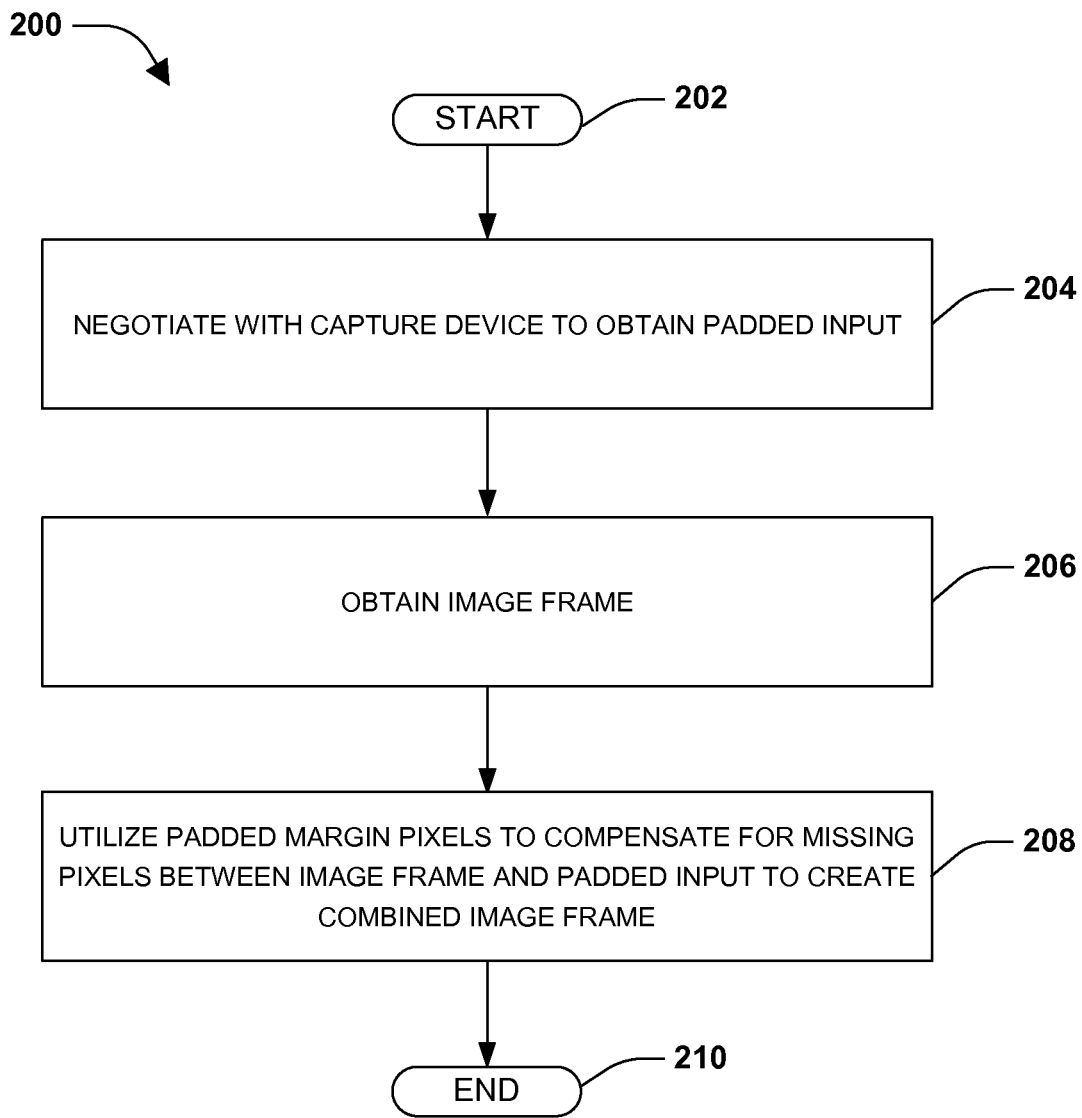
FIG. 2 is a flow diagram illustrating an exemplary method of image frame generation.

An embodiment of image frame generation is illustrated by an exemplary method 200 of FIG. 2. At 202, the method starts. At 204, a capture device may be negotiated with to obtain a padded input. For example, a user of a smart phone may set a target resolution of a video capture application to be 1920×1080. The capture device, such as a camera associated with smart phone, may be capable of capturing imagery larger than 1920×1080. Accordingly, the capture device may be instructed to capture the padded input at a padded resolution of 2112×1188. The padded input comprises padded margin pixels (e.g., padded margin pixels may correspond to a portion of the 2112×1188 pixels that surround the 1920×1080 pixels).

At 206, an image frame, that is to be combined with the padded input, may be obtained. For example, the image frame and the padded input may be combined (e.g., stitched together) to create a panorama or may be combined (e.g., aligned) to create a globally aligned image frame. In an example, the image frame may have a resolution that is the same as the target resolution. In another example, the image frame may have a resolution that is the same of the padded resolution. In another example, the image frame may have a resolution that is different than both the target resolution and the padded resolution. At 208, the padded margin pixels may be utilized to compensate for one or more missing pixels between the image frame and the padded input to create a combined image frame, such as the panorama or the globally aligned image frame. At 210, the method ends.

Figure 3A:
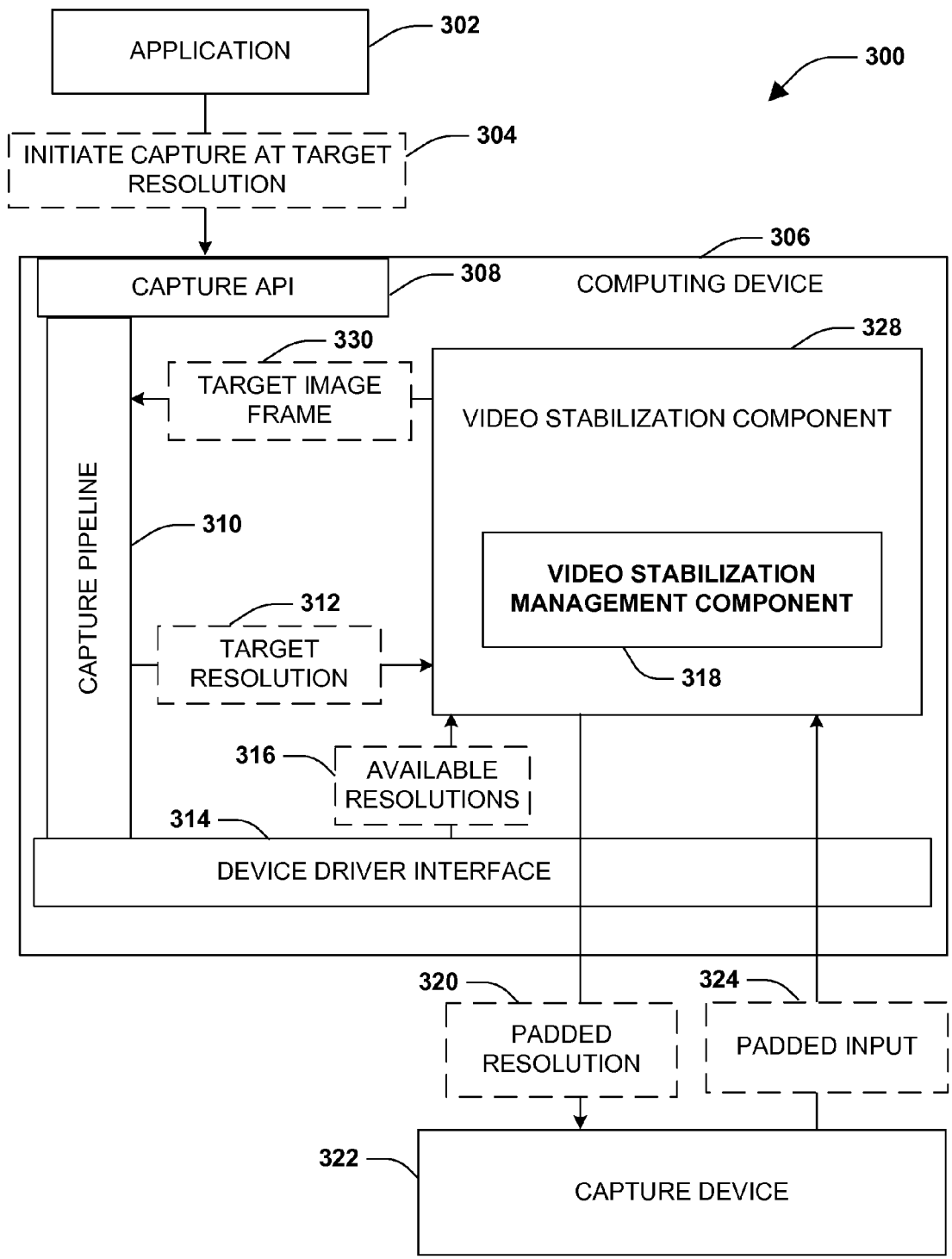
FIG. 3A is a component block diagram illustrating an exemplary system for video stabilization.

FIGS. 3A-3D illustrate examples of a system 300 for video stabilization. FIG. 3A illustrates the system 300 comprising a video stabilization management component 318 associated with a computing device 306 (e.g., a digital camera, a tablet, a smart phone, a watch, a wearable device, glasses, etc.). The computing device 306 may be associated with a capture device 322, such as a camera capable of capturing video. The video stabilization management component 318 may identify a request 304, such as from an application 302 through a capture application programming interface (API) and a capture pipeline 310, to initiate capture of image frames at a target resolution 312 (e.g., 1080p, 720p, VGA, etc.). The video stabilization management component 318 may obtain a set of available resolutions 316 (e.g., 2112×1188, 1080p, 720p, etc.), such as from a device driver interface 314 for the capture device 322. The video stabilization management component 318 may generate a padded pixel percentage parameter based upon at least one of a cropping metric used by a video stabilization component 328, a field of view (FOV) of a sensor of the capture device 322, an amount of padding to be used by the video stabilization component 328, an analysis of available computing resources of the computing device 306, the set of available resolutions 316, or the target resolution 312, and may determine a padded resolution based upon the padded pixel percentage parameter (e.g., a padded resolution 320 of 2112×1188 may be determined based upon a 10% padded pixel percentage parameter between a target resolution of 1920×1080 and an available resolution of 2112×1188). In an example, the padded resolution is larger than the target resolution.

The video stabilization management component 318 may provide the padded resolution 320 to the capture device 322, such as through the device driver interface 314. The capture device 322 may capture padded input 324 according to the padded resolution 320, 324. The padded input 324 may have the padded resolution of 2112×1188 that is larger than the target resolution of 1920×1080. In this way, the padded input 324 comprises padded margin pixels (e.g., 10% of the 2112×1188 may be padded margin pixels based upon the padded resolution being 10% larger than the target resolution).

The video stabilization management component 318 may provide the padded input 324 to the video stabilization component 328. The video stabilization component 328 may perform various image stabilization functions, such as cropping, to create a target image frame 330 having the target resolution. For example, the video stabilization management component 318 may instruct the video stabilization component 328 to crop one or more padded margin pixels during image stabilization, which may mitigate the need to perform image upscaling after cropping to obtain the target image frame 330 at the target resolution 312 (e.g., up to 10% of the 2112×1188 padded resolution may be cropped without going below the target resolution of 1920×1080). Reducing or eliminating image upscaling may mitigate image blur that would have otherwise resulted from the image upscaling.

Figure 3B:
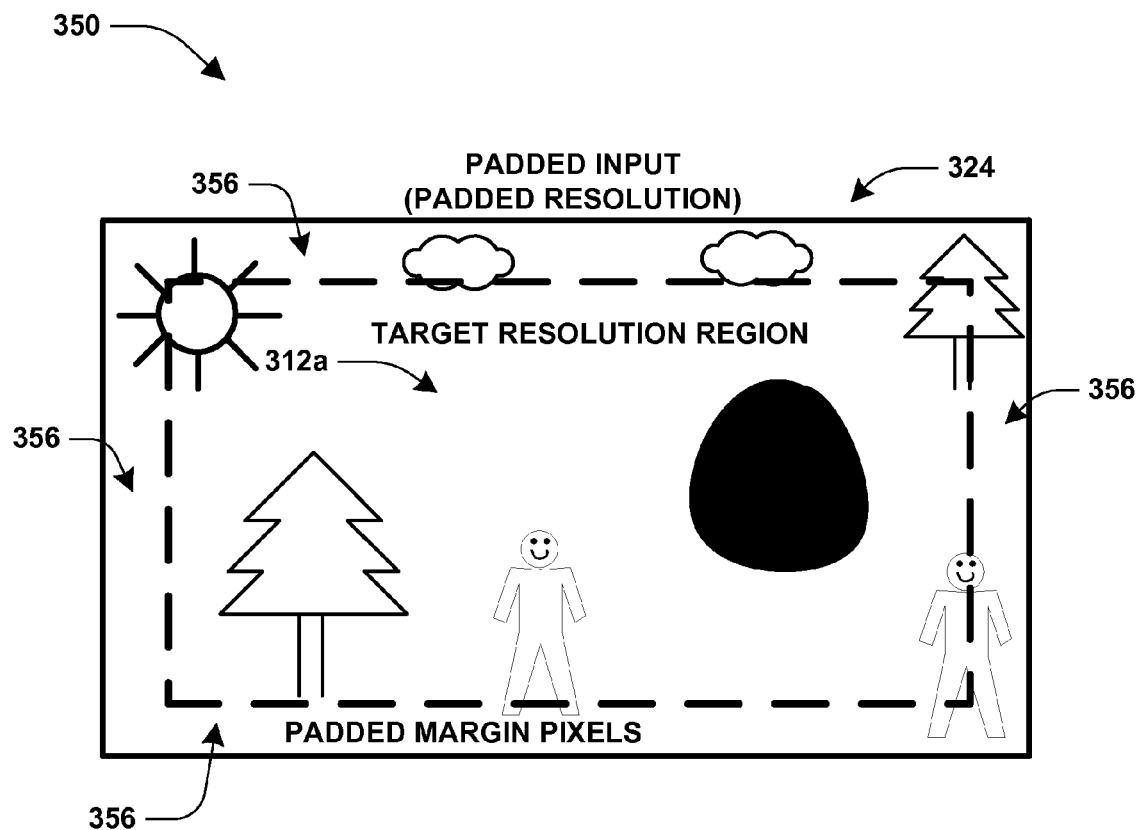
FIG. 3B is an illustration of an example of a padding input having a padded resolution larger than a target resolution.

FIG. 3B illustrates an example 350 of the padded input 324 having the padded resolution 320. The padded input 324 may depict an outdoor scene with two people, two trees, a lake, two clouds, and a sun. Because the target resolution 312 is 10% smaller than the padded resolution 320, a target resolution region 312a is comprised within and is smaller than the padded input 324 (e.g., a portion of the sun, the two people, a tree, and the two clouds may be outside the target resolution region 312a). Thus, the padded input 324 comprises 10% padded margin pixels 356 that surround the target resolution region 312a.

Figure 3C:
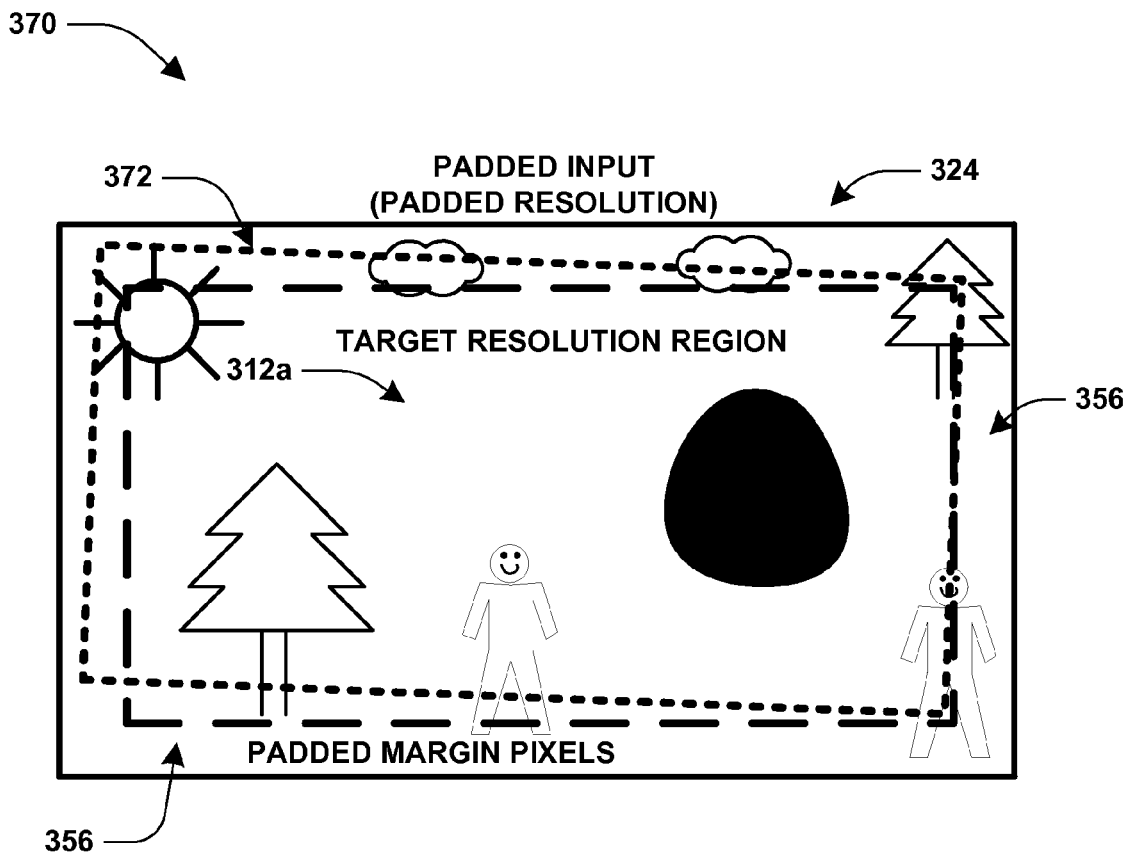
FIG. 3C is an illustration of an example of cropping a padded input during stabilization.
Figure 3D:
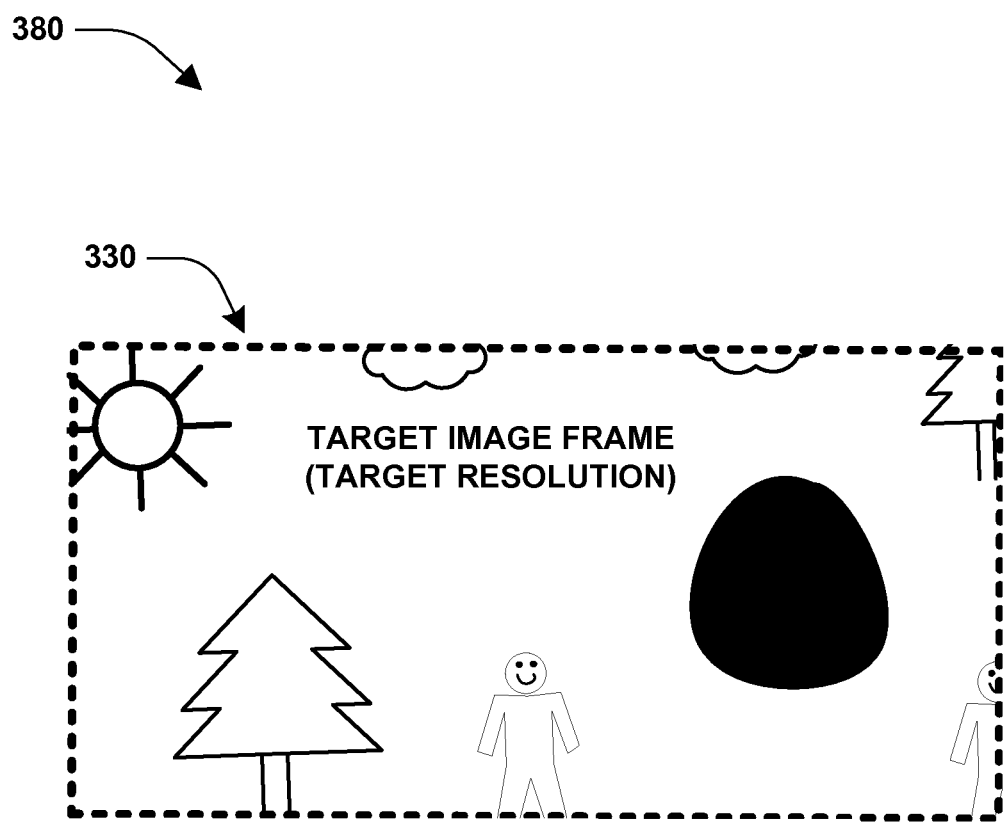
FIG. 3D is an illustration of an example of a target image frame resulting from stabilization.

FIG. 3C illustrates an example 370 of a stabilization cropping region 372 used by the video stabilization component 328 to crop the padded input 324 in order to stabilize the padded input 324, such as to compensate for hand jitter or other motion during video capture by the capture device 322. The stabilization cropping region 372 may comprise at least some of the padded margin pixels 356, which may mitigate instances where the stabilization cropping region 372 comprises an area outside the target resolution region 312a that would otherwise result in a cropped image that would need to be upscaled to the target resolution 312 (e.g., the top left portion of the stabilization cropping region 372 would comprise an area outside the target resolution region 312a for which no pixel data is available, and thus the cropped image would be upscaled to compensate for the lack of pixel data). FIG. 3D illustrates an example 380 of the target image frame 330 after stabilization. For example, the target image frame 330 has the target resolution 312 with little to no upscaling because the stabilization cropping region 372 utilized the padded margin pixels 356 for cropping.

Figure 4:
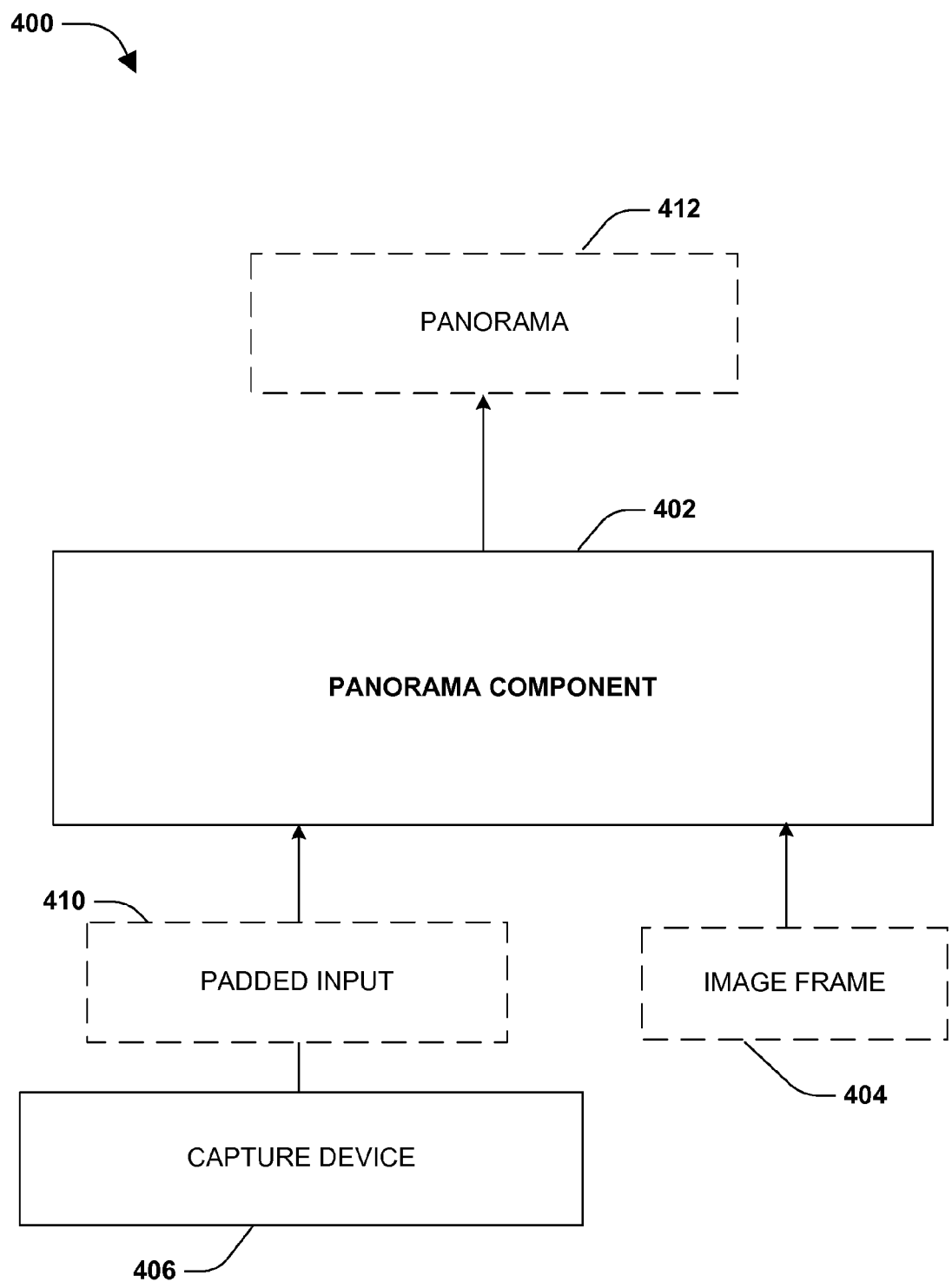
FIG. 4 is a component block diagram illustrating an exemplary system for generating a panorama.

FIG. 4 illustrates an example of a system 400 for generating a panorama 412. The system 400 comprises a panorama component 402. The panorama component 402 may be configured to obtain a padded input 410 from a capture device 406. For example, the capture device 406 may capture imagery at a padded resolution that is larger than a target resolution (e.g., a resolution of images that are to be stitched together to create the panorama 412). The panorama component 402 may obtain an image frame 404 that is to be used with the padded input 410 for generating the panorama 412. The panorama component 402 may utilize padded margin pixels of the padded input 410 to compensate for one or more missing pixels, which may have resulted from global translation and/or warping, between the image frame 404 (e.g., at the target resolution) and the padded input 410 (e.g., a portion of the padded input 410 corresponding to the target resolution) to create the panorama 412. In this way, the padded margin pixels may be used as supplemental pixels outside the target resolution portion of the padded input 410 for panorama stitching. It will be appreciated that the image frame 404 may have a resolution that is the same as or different than a resolution of the padded input 410. It will also be appreciated that the padded input 410 may be used with any number of image frames to create the panorama 412.

Figure 5:
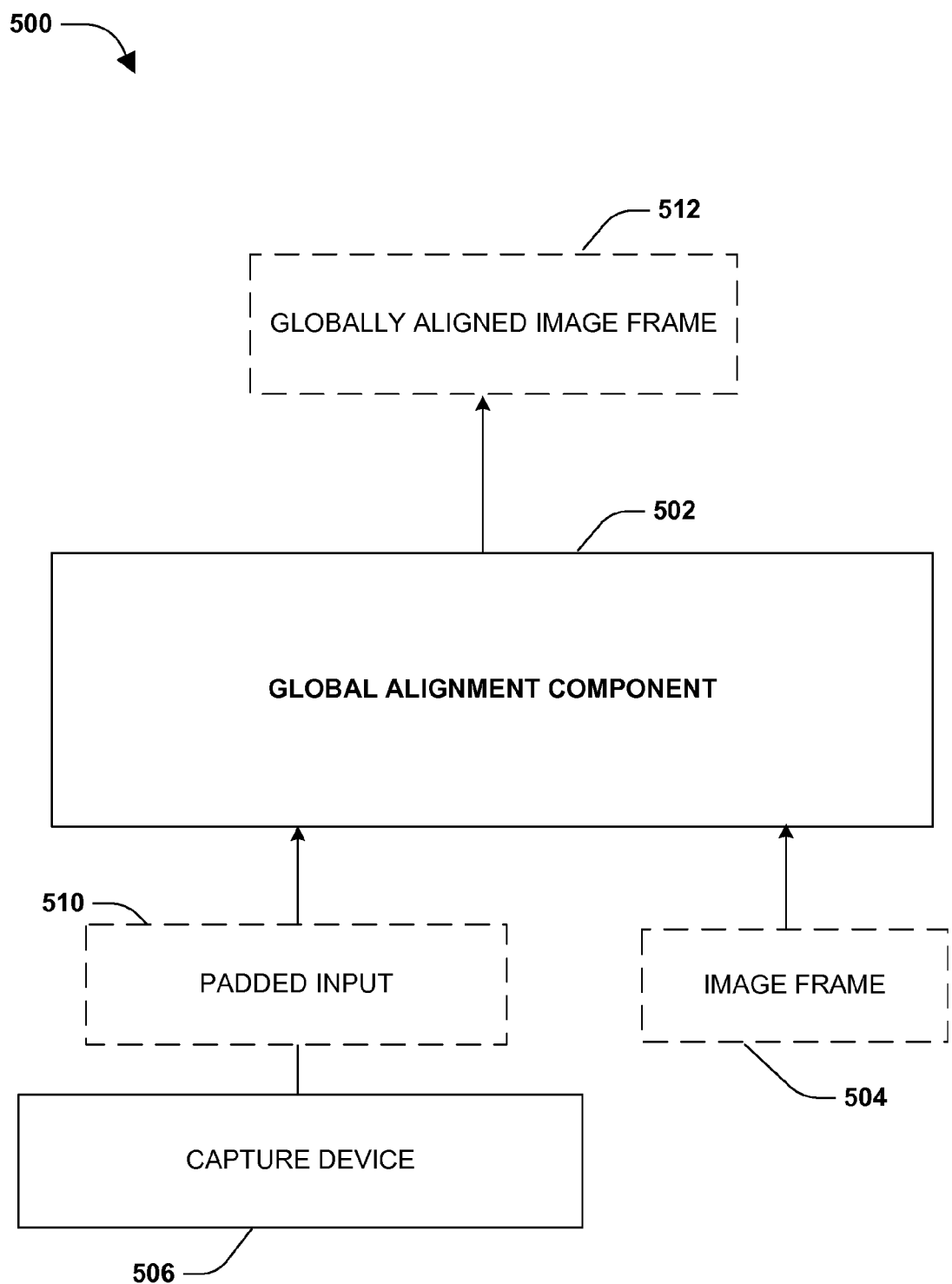
FIG. 5 is a component block diagram illustrating an exemplary system for generating a globally aligned image frame.

FIG. 5 illustrates an example of a system 500 for generating a globally aligned image frame 512. The system 500 comprises a global alignment component 502. The global alignment component 502 may be configured to obtain a padded input 510 from a capture device 506. For example, the capture device 506 may capture imagery at a padded resolution that is larger than a target resolution (e.g., a resolution of images that are to be globally aligned). The global alignment component 502 may obtain an image frame 504 that is to be globally aligned with the padded input 510 at the target resolution. The global alignment component 502 may utilize padded margin pixels of the padded input 510 to compensate for one or more missing pixels between the image frame 504 (e.g., at the target resolution) and the padded input 510 (e.g., a portion of the padded input 510 corresponding to the target resolution) to create the globally aligned image frame 512. In this way, the padded margin pixels may be used as supplemental pixels outside the target resolution portion of the padded input 510 for global alignment. It will be appreciated that the image frame 504 may have a resolution that is the same as or different than a resolution of the padded input 510. It will also be appreciated that the padded input 510 may be used with any number of image frames to create the globally aligned image frame 512.

Figure 6:
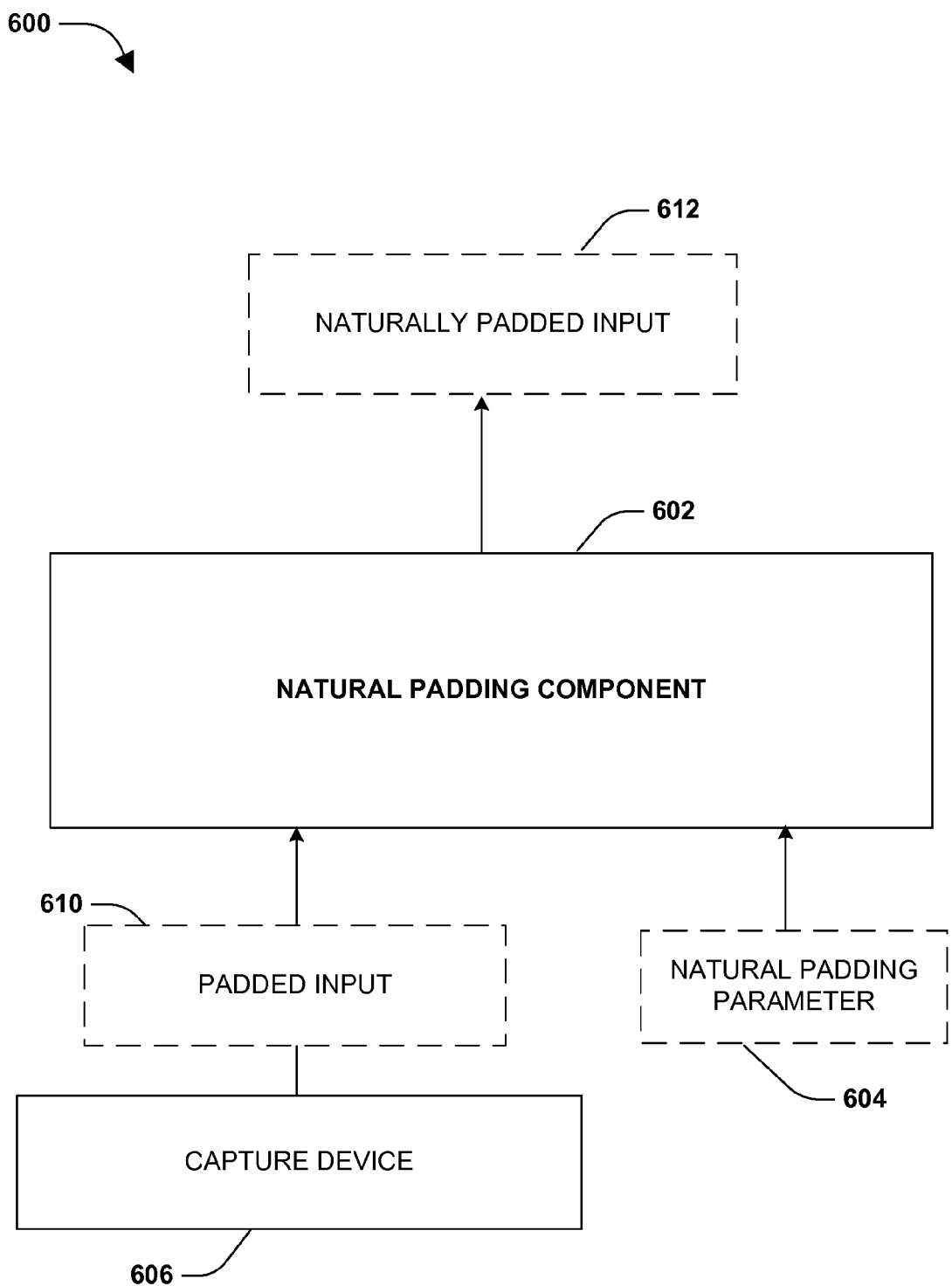
FIG. 6 is a component block diagram illustrating an exemplary system for generating a naturally padded input.

FIG. 6 illustrates an example of a system 600 for generating a naturally padded input 612 for use by video encoding functionality. The system 600 comprises a natural padding component 602. The natural padding component 602 may be configured to obtain a padded input 610 from a capture device 606. For example, the capture device 606 may capture imagery at a padded resolution that is larger than a target resolution used by the video encoding functionality. The natural padding component 602 may identify a natural padding parameter 604 used by the video encoding functionality. Instead of merely using black lines, green lines, or other colored lines, the natural padding component may utilize padded margin pixels of the padded input 610 to create the naturally padded input 612 for use by the video encoding functionality.

According to an aspect of the instant disclosure, a method for video stabilization is provided. The method includes negotiating with a capture device to obtain a padded input. The padded input comprises padded margin pixels. The padded input has a padded resolution larger than a target resolution. The method includes providing the padded input to a video stabilization component to obtain a target image frame having the target resolution.

According to an aspect of the instant disclosure, a system for video stabilization is provided. The system includes a video stabilization management component. The video stabilization management component is configured to negotiate with a capture device to obtain a padded input. The padded input comprises padded margin pixels. The padded input has a padded resolution larger than a target resolution. The video stabilization management component is configured to provide the padded input to a video stabilization component to obtain a target image frame having the target resolution.

According to an aspect of the instant disclosure, a method for image frame generation is provided. The method includes negotiating with a capture device to obtain a padded input. The padded input comprises padded margin pixels. The method includes obtaining an image frame to be combined with the padded input. The method includes utilizing the padded margin pixels to compensate for one or more missing pixels between the image frame and the padded input to create a combined image frame.

According to an aspect of the instant disclosure, a means for video stabilization is provided. A capture device is negotiated with to obtain a padded input, by the means for video stabilization. The padded input comprises padded margin pixels. The padded input has a padded resolution larger than a target resolution. The padded input is provided to a video stabilization component to obtain a target image frame having the target resolution, by the means for video stabilization.

According to an aspect of the instant disclosure, a means for image frame generation is provided. A capture device is negotiated with to obtain a padded input, by the means for image frame generation. The padded input comprises padded margin pixels. An image frame is obtained for combination with the padded input, by the means for image frame generation. The padded margin pixels are utilized to compensate for one or more missing pixels between the image frame and the padded input to create a combined image frame, by the means for image frame generation.

Figure 7:
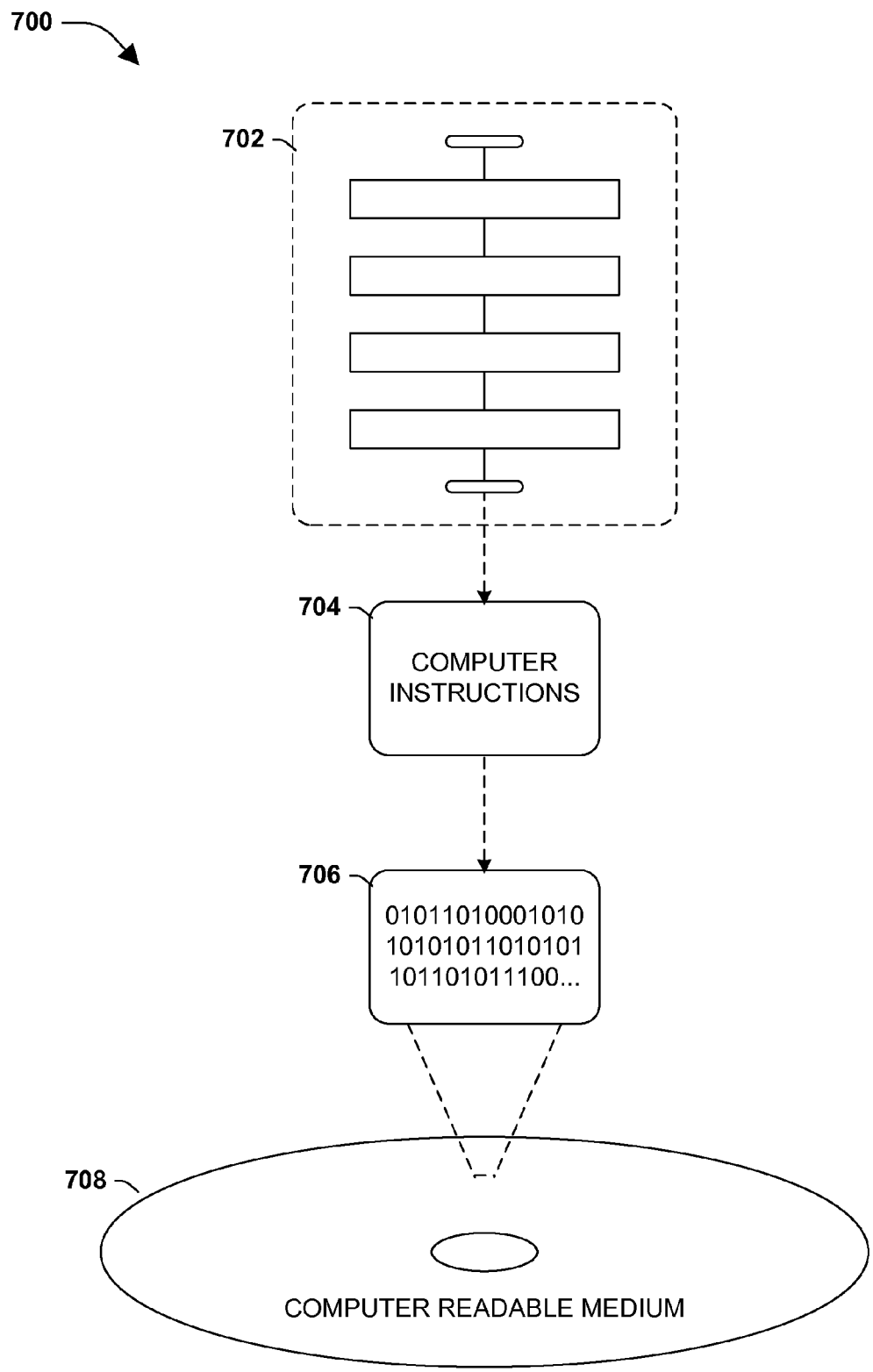
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 200 of FIG. 2, for example. In some embodiments, the processor-executable instructions 704 are configured to implement a system, such as at least some of the exemplary system 300 of FIG. 3A, at least some of the exemplary system 400 of FIG. 4, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
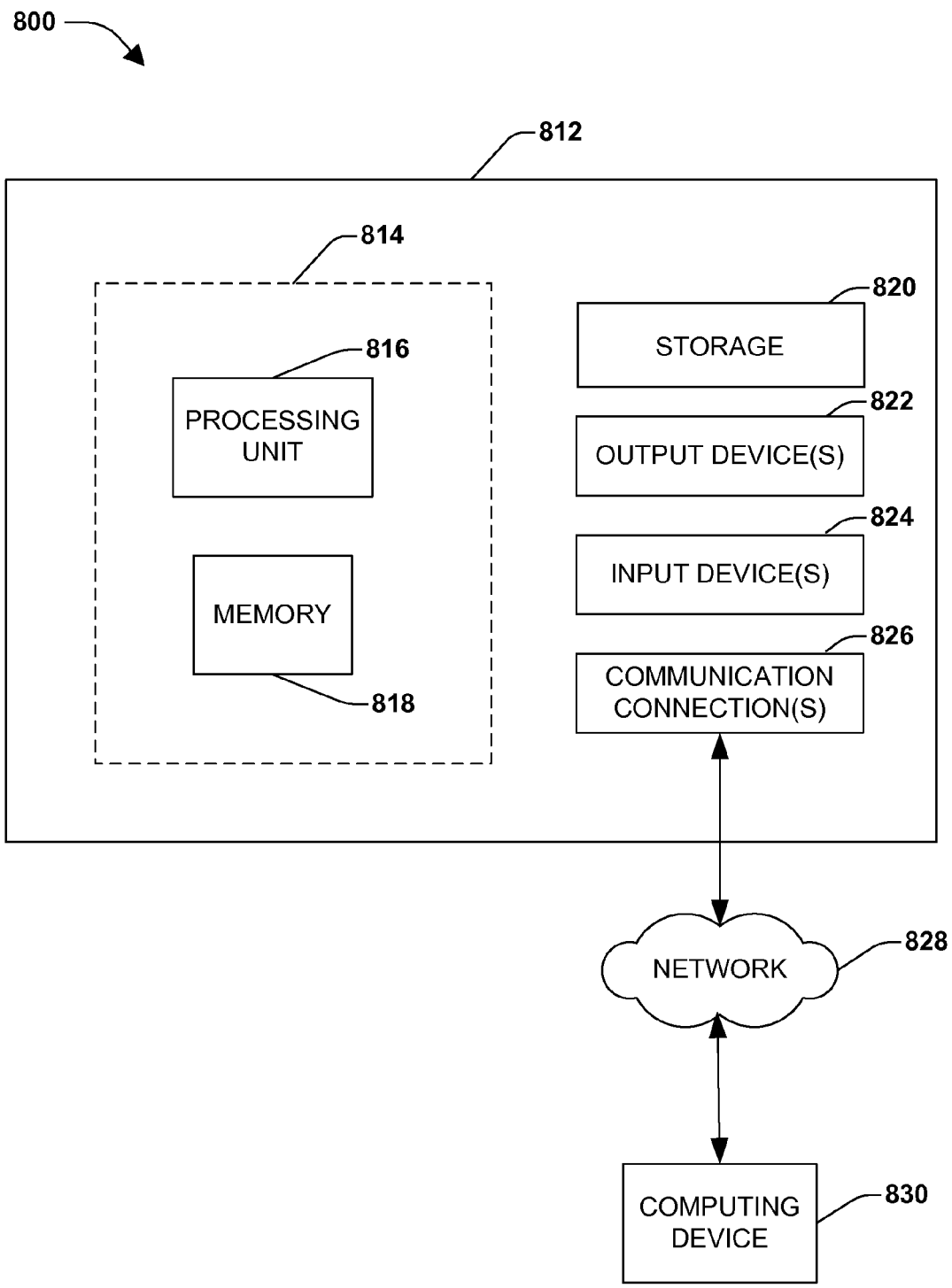
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for video stabilization, comprising:
   negotiating with a capture device to obtain a padded input, the padded input comprising padded margin pixels, the padded input having a padded resolution larger than a target resolution, the negotiating with the capture device comprising:
      selecting a padded pixel percentage parameter based upon at least one of a cropping metric used by the video stabilization component, a field of view (FOV) of a sensor of the capture device, an amount of padding to be used by the video stabilization component, a set of available resolutions for the capture device, the target resolution, or an analysis of available computer resources of a computing device associated with the capture device; and
      instructing the capture device to obtain the padded input based upon the padded pixel percentage parameter; and
   providing the padded input to a video stabilization component to obtain a target image frame having the target resolution.

2. The method of claim 1, the providing the padded input comprising:
   instructing the video stabilization component to utilize one or more padded margin pixels during stabilization to generate the target image frame.

3. The method of claim 2, the instructing comprising:
   instructing the video stabilization component to utilize the one or more padded margin pixels in place of image upscaling functionality to generate the target image frame.

4. The method of claim 1, the padded pixel percentage parameter less than or equal to about 20%.

5. The method of claim 1, comprising:
   responsive to the padded pixel percentage parameter matching the cropping metric, instructing the video stabilization component to crop a portion of the padded input corresponding to the padded pixel percentage parameter to create the target image frame.

6. The method of claim 1, comprising:
   responsive to the padded pixel percentage parameter being larger than the cropping metric:
      instructing the video stabilization component to crop a portion of the padded input corresponding to the cropping metric to create an intermediary image frame; and
      instructing the video stabilization component to downsize the intermediary image frame to create the target image frame.

7. The method of claim 1, comprising:
   responsive to the padded pixel percentage parameter being smaller than the cropping metric:
      instructing the video stabilization component to crop a portion of the padded input corresponding to the cropping metric; and
      setting an aperture setting to indicate that one or more regions of the target image frame are invalid.

8. The method of claim 1, comprising:
   obtaining an image frame that is to be globally aligned with the padded input; and
   utilizing the padded margin pixels to compensate for one or more missing pixels between the image frame and the padded input to create a globally aligned image frame.

9. The method of claim 1, comprising:
   obtaining an image frame that is to be used with the padded input for generating a panorama; and
   utilizing the padded margin pixels to compensate for one or more missing pixels between the image frame and the padded input to create the panorama.

10. The method of claim 1, comprising:
   identifying a natural padding parameter used by video encoding functionality; and
   utilizing the padded margin pixels as naturally padded input for use by the video encoding functionality.

11. A system for video stabilization, comprising:
a video stabilization management component configured to:
   generate a padded pixel percentage parameter;
   determine a padded resolution based upon the padded pixel percentage parameter and a target resolution; and
   provide the padded resolution to a capture device, utilizing a digital driver interface, for use by the capture device in capturing a padded input;
   negotiate with the capture device to obtain the padded input, the padded input comprising padded margin pixels, the padded input having a padded resolution larger than the target resolution; and
   provide the padded input to a video stabilization component to obtain a target image frame having the target resolution.

12. The system of claim 11, the video stabilization management component configured to:
   generate the padded pixel percentage parameter based upon at least one of a cropping metric used by the video stabilization component, a field of view (FOV) of a sensor of the capture device, an amount of padding to be used by the video stabilization component, a set of available resolutions for the capture device, the target resolution, or an analysis of available computing resources of a computing device associated with the capture device.

13. The system of claim 11, comprising:
a panorama component configured to:
   obtain an image frame that is to be used with the padded input for generating a panorama; and
   utilize the padded margin pixels to compensate for one or more missing pixels between the image frame and the padded input to create the panorama.

14. The system of claim 11, comprising:
a global alignment component configured to:
   obtain an image frame that is to be globally aligned with the padded input; and
   utilize the padded margin pixels to compensate for one or more missing pixels between the image frame and the padded input to create a globally aligned image frame.

15. The system of claim 11, comprising:
a natural padding component configured to:
   identify a natural padding parameter used by video encoding functionality; and
   utilize the padded margin pixels as naturally padded input for use by the video encoding functionality.

16. A method for image frame generation comprising:
negotiating with a capture device to obtain a padded input, the padded input comprising padded margin pixels the negotiating with the capture device comprising:
   selecting a padded pixel percentage parameter based upon at least one of a cropping metric used by the video stabilization component, a field of view (FOV) of a sensor of the capture device, an amount of padding to be used by the video stabilization component, a set of available resolutions for the capture device, the target resolution, or an analysis of available computer resources of a computing device associated with the capture device; and
   instructing the capture device to obtain the padded input based upon the padded pixel percentage parameter;
obtaining an image frame to be combined with the padded input; and
utilizing the padded margin pixels to compensate for one or more missing pixels between the image frame and the padded input to create a combined image frame.

17. The method of claim 16, the combined image frame comprising at least one of a panorama or a globally aligned image frame.

18. The system of claim 11, the padded pixel percentage parameter less than or equal to about 20%.

19. The system of claim 11, the analysis of available computer resources of the computing device associated with the capture device is based on at least one of processor load, bandwidth or memory.

20. The method of claim 16, the padded pixel percentage parameter less than or equal to about 20%.

* * * * *